United States Patent
Lightowler et al.

(10) Patent No.: US 11,276,050 B1
(45) Date of Patent: Mar. 15, 2022

(54) PROVIDING AUGMENTED REALITY USER INTERFACES FOR AUTOMATED TELLER MACHINE TRANSACTIONS

(71) Applicant: Bank of America Corporation, Charlotte, NC (US)

(72) Inventors: Ben Lightowler, Sandhurst (GB); David Mortman, Worthington, OH (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/060,601

(22) Filed: Oct. 1, 2020

(51) Int. Cl.
*G06Q 20/10* (2012.01)
*G06Q 20/32* (2012.01)
*G06Q 20/40* (2012.01)
*G06T 19/00* (2011.01)

(52) U.S. Cl.
CPC ..... *G06Q 20/1085* (2013.01); *G06Q 20/3223* (2013.01); *G06Q 20/3276* (2013.01); *G06Q 20/3278* (2013.01); *G06Q 20/4014* (2013.01); *G06T 19/006* (2013.01)

(58) Field of Classification Search
None
See application file for complete search history.

(56) References Cited

U.S. PATENT DOCUMENTS

| | | |
|---|---|---|
| 4,660,168 A | 4/1987 | Grant et al. |
| 8,083,141 B1 | 12/2011 | Courtright |
| 8,292,170 B1 | 10/2012 | Courtright |
| 8,881,977 B1 * | 11/2014 | Paczkowski ......... G06Q 20/322 235/379 |
| 9,224,113 B2 | 12/2015 | Grigg et al. |
| 9,760,947 B2 | 9/2017 | Murray et al. |
| 9,792,594 B1 | 10/2017 | Bayha et al. |
| 10,331,874 B1 * | 6/2019 | Benkreira ............ G06Q 20/322 |
| 10,546,280 B2 | 1/2020 | Beesetti et al. |
| 2001/0007332 A1 | 7/2001 | Kjonaas et al. |
| 2012/0233072 A1 | 9/2012 | Calman et al. |
| 2012/0259778 A1 | 10/2012 | Banerjee et al. |
| 2014/0164244 A1 | 6/2014 | Wilson |
| 2014/0263618 A1 * | 9/2014 | McCarthy ............. G06Q 40/02 235/379 |
| 2015/0058216 A1 | 2/2015 | Luciani |

(Continued)

*Primary Examiner* — Joseph W. King
(74) *Attorney, Agent, or Firm* — Banner & Witcoff, Ltd.

(57) ABSTRACT

Aspects of the disclosure relate to providing augmented reality user interfaces for ATM transactions. In some embodiments, a computing platform may receive presence information indicating that a mobile computing device is within a predetermined distance of a first ATM at a first location, authenticate a user of the mobile computing device to an online banking account, and generate a transaction-specific device identifier that uniquely identifies the first ATM at the first location. Thereafter, the computing platform may generate and send an augmented reality user interface to the mobile computing device, prompting the user to use the mobile computing device to capture the transaction-specific device identifier. Based on verifying that the user is authorized to perform a transaction at the first ATM, the computing platform may cause an NFC connection to be established between the mobile computing device and the first ATM, via which the transaction may be conducted.

16 Claims, 10 Drawing Sheets

(56) References Cited

U.S. PATENT DOCUMENTS

| | | |
|---|---|---|
| 2015/0134430 A1 | 5/2015 | Ellis et al. |
| 2015/0198446 A1 | 7/2015 | Perez et al. |
| 2015/0287018 A1 | 10/2015 | Iqbal et al. |
| 2016/0162869 A1 | 6/2016 | Gupta et al. |
| 2018/0300723 A1 | 10/2018 | Smith et al. |
| 2019/0108731 A1 | 4/2019 | Hazard et al. |
| 2019/0377862 A1 | 12/2019 | Benkreira et al. |
| 2020/0073681 A1* | 3/2020 | Carroll ................. G06F 3/0484 |
| 2020/0082367 A1* | 3/2020 | Dent ..................... G07F 19/206 |
| 2020/0175154 A1 | 6/2020 | Ratnakaram et al. |
| 2020/0279439 A1 | 9/2020 | Callaghan |

* cited by examiner

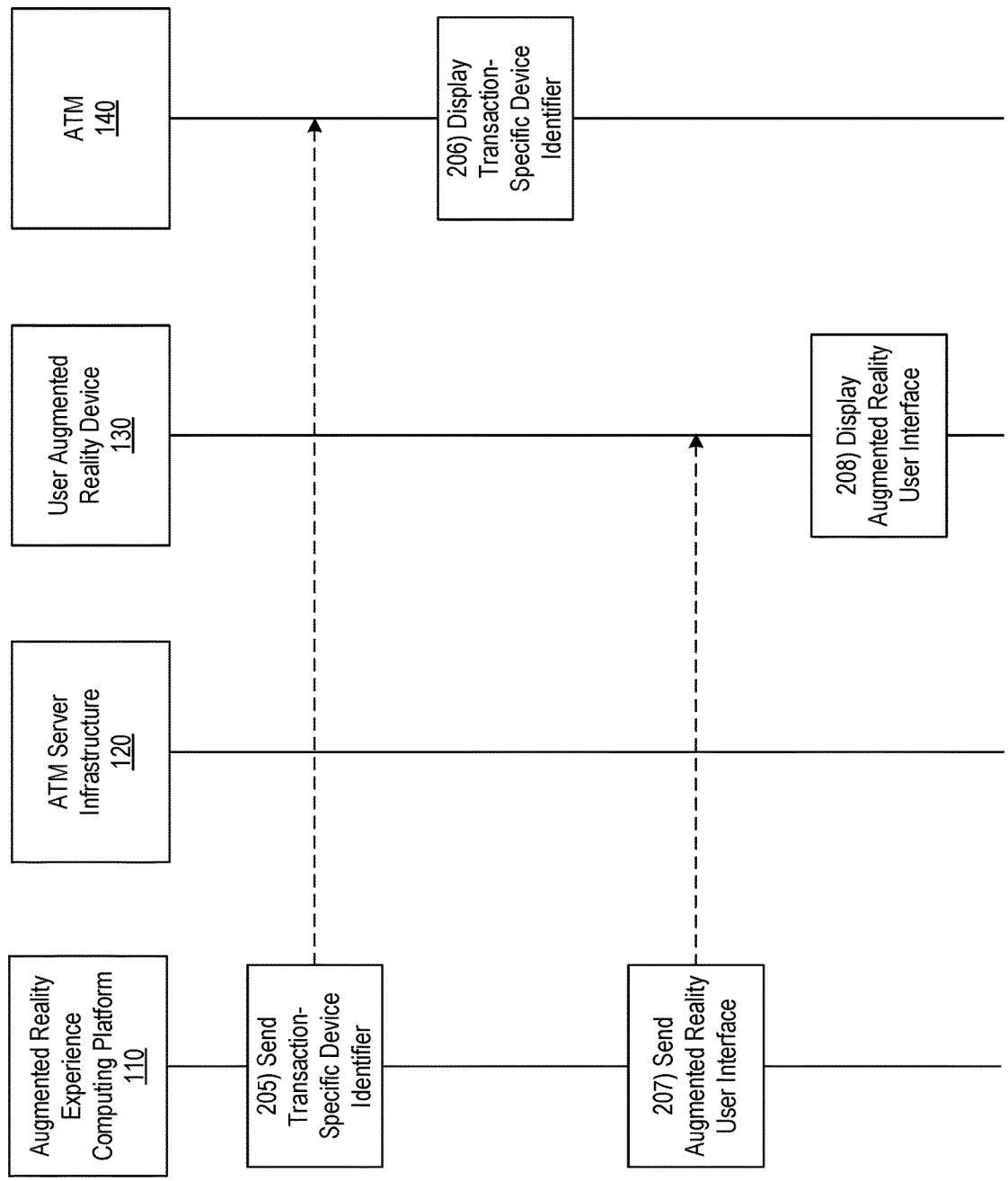

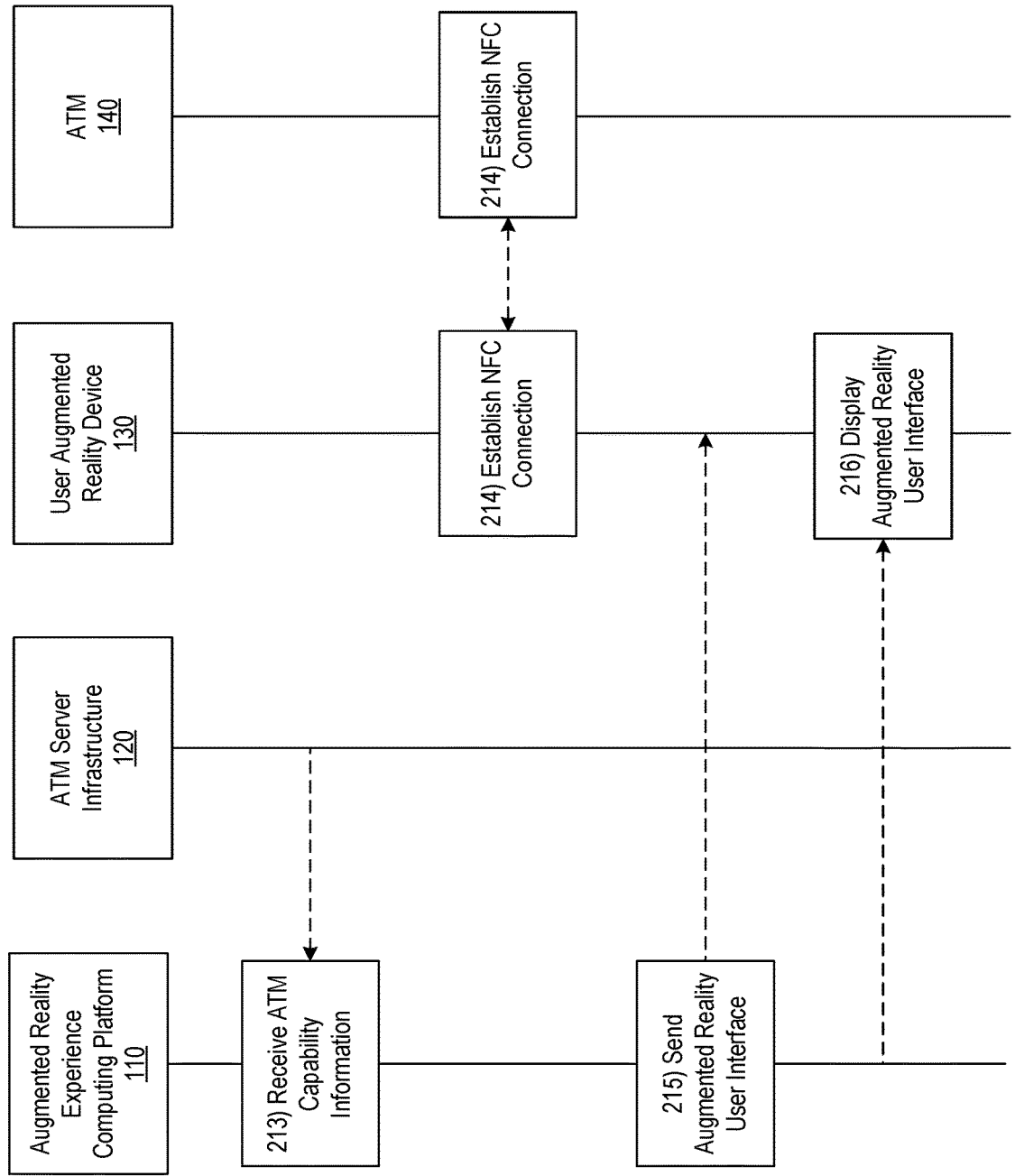

PROVIDING AUGMENTED REALITY USER INTERFACES FOR AUTOMATED TELLER MACHINE TRANSACTIONS

BACKGROUND

Aspects of the disclosure relate to data processing and augmented reality interfaces and devices. In particular, one or more aspects of the disclosure relate to enhanced processing systems for providing augmented reality user interfaces on a mobile computing device for automated teller machine (ATM) transactions.

Many organizations and individuals rely on automated teller machines as a means for conducting transactions and providing account access. In many instances, interacting with an automated teller machine on an integrated display screen may pose security risks from nearby individuals who may be able to obtain confidential information or otherwise interfere with a given transaction. In addition, in many instances, ATM transactions involve users touching buttons or other controls on display screens of ATM machines which may be frequently touched by many people, but might not be cleaned or disinfected between users. It may be important to provide a completely or nearly contactless solution for conducting ATM transactions, e.g., from authenticating a user at an ATM to completing a transaction at the ATM, while increasing the functionality available via the ATM machine and ensuring the safety and security of the transaction.

SUMMARY

Aspects of the disclosure provide effective, efficient, scalable, and convenient technical solutions that address and overcome the technical problems associated with providing augmented reality user interfaces and controlling an automated teller machine using a mobile computing device. For example, some aspects of the disclosure provide techniques that may enable computing platforms to cause display of enhanced or augmented reality interfaces to provide transaction assistance and increase security corresponding to automated teller machine transactions. Additional aspects of the disclosure provide techniques for establishing a near field communication (NFC) connection between a mobile computing device and an ATM, leveraging NFC capability of the ATM and augmented reality capability of the mobile computing device for enhancing the ATM transaction experience.

In accordance with one or more embodiments, a computing platform having at least one processor, a communication interface, and memory may receive, via the communication interface, presence information indicating that a mobile computing device is within a predetermined distance of a first ATM at a first location. Subsequently, the computing platform may authenticate a user of the mobile computing device to an online banking account. Next, the computing platform may generate a transaction-specific device identifier associated with the first ATM. In addition, the transaction-specific device identifier may uniquely identify the first ATM at the first location. Then, the computing platform may send, via the communication interface, to the mobile computing device, a first augmented reality user interface generated for the mobile computing device. In addition, sending the first augmented reality user interface generated for the mobile computing device may cause the mobile computing device to display the first augmented reality user interface and prompt the user of the mobile computing device to use the mobile computing device to capture the transaction-specific device identifier associated with the first ATM. Thereafter, the computing platform may verify that the user of the mobile computing device is authorized to perform a transaction at the first ATM at the first location based on the transaction-specific device identifier captured by the mobile computing device. Based on verifying that the user of the mobile computing device is authorized to perform the transaction at the first ATM at the first location, the computing platform may cause a near field communication connection to be established between the mobile computing device and the first ATM. After the near field communication connection is established, the computing platform may cause the first ATM to complete the transaction based on information received from the mobile computing device via the near field communication connection.

In some embodiments, the computing platform may send, via the communication interface, the transaction-specific device identifier to the first ATM. Then, computing platform may cause the first ATM to display the transaction-specific device identifier.

In some embodiments, generating the transaction-specific device identifier associated with the first ATM may include generating one or more of: a quick response (QR) code, a unique numerical identifier, or a unique graphical identifier.

In some embodiments, information displayed on a display screen of the first ATM may be associated with, but different from, information displayed on the first augmented reality user interface generated for the mobile computing device. In some embodiments, information displayed on a display screen of the first ATM may include information displayed in non-human readable form. In some embodiments, information displayed on the first augmented reality user interface generated for the mobile computing device may include information displayed in human-readable form.

In some embodiments, information displayed on the first augmented reality user interface generated for the mobile computing device may include information displayed in a preferred language associated with the mobile computing device.

In some embodiments, based on receiving the presence information indicating that the mobile computing device is within the predetermined distance of the first ATM at the first location, the computing platform may send, via the communication interface, to the mobile computing device, a notification identifying the first ATM at the first location as having augmented reality capability.

In some embodiments, the computing platform may receive, via the communication interface, presence information indicating that the mobile computing device is outside of the predetermined distance of the first ATM at the first location. Based on receiving the presence information indicating that the mobile computing device of the user is outside of the predetermined distance of the first ATM at the first location, the computing platform may terminate the transaction at the first ATM.

In some embodiments, the computing platform may receive, via the communication interface, capability information of the first ATM at the first location. Based on receiving the capability information of the first ATM at the first location, the computing platform may send, via the communication interface, to the mobile computing device, a second augmented reality user interface generated for the mobile computing device. In addition, sending the second augmented reality user interface generated for the mobile computing device may cause the mobile computing device to display the second augmented reality user interface and prompt the user of the mobile computing device to use the mobile computing device to perform the transaction at the first ATM.

In some embodiments, prompting the user of the mobile computing device to use the mobile computing device to perform the transaction at the first ATM may include prompting the user of the mobile computing device to use the mobile computing device to read information displayed on a display screen of the first ATM. In addition, the information displayed on the display screen of the first ATM may be associated with, but different from, information displayed on the second augmented reality user interface generated for the mobile computing device. In some embodiments, the information displayed on the display screen of the first ATM may include information displayed in non-human readable form. In some embodiments, the information displayed on the second augmented reality user interface generated for the mobile computing device may include information displayed in human-readable form.

In some embodiments, the information displayed on the second augmented reality user interface generated for the mobile computing device may include information displayed in a preferred language associated with the mobile computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for deploying an enhanced processing system that provides augmented reality user interfaces on a mobile computing device for conducting ATM transactions in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
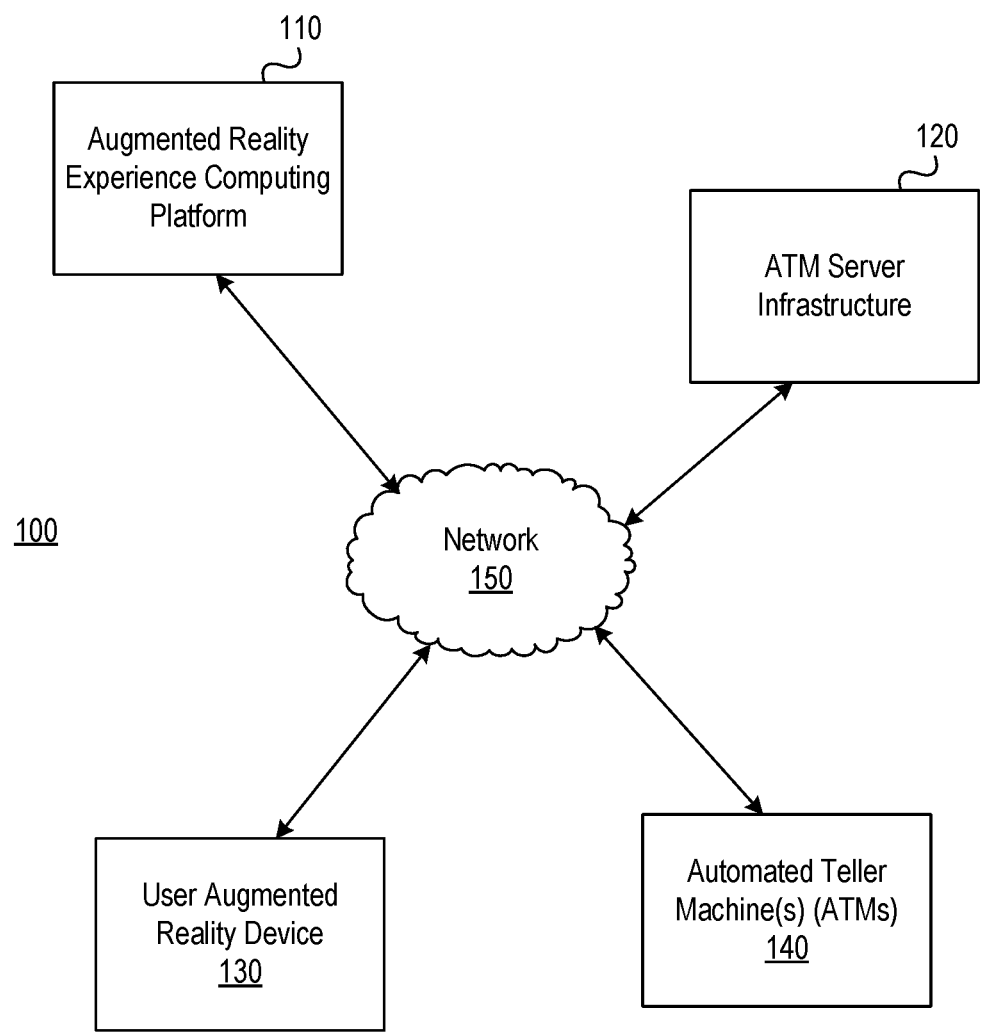
FIGS. 1A and 1B depict an illustrative computing environment for deploying an enhanced processing system that provides augmented reality user interfaces on a mobile computing device for conducting ATM transactions in accordance with one or more example embodiments.
Figure 1B:
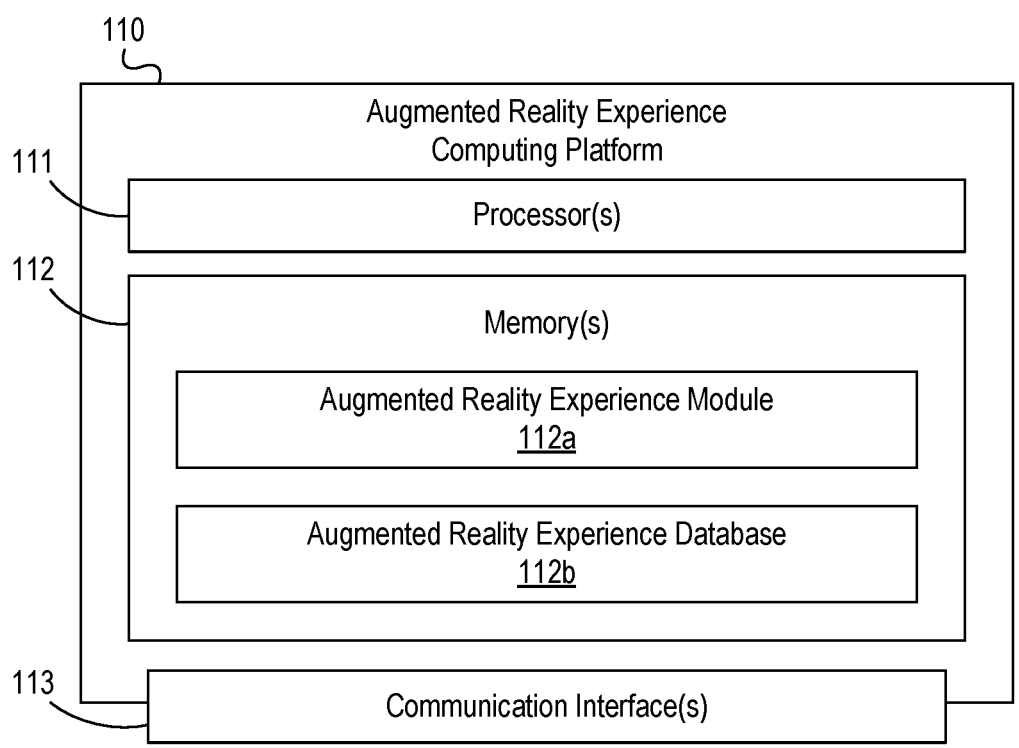

FIGS. 1A and 1B depict an illustrative computing environment for deploying an enhanced processing system that provides augmented reality user interfaces on a mobile computing device for conducting ATM transactions in accordance with one or more example embodiments. Referring to FIG. 1A, computing environment 100 may include one or more computer systems. For example, computing environment 100 may include an augmented reality experience computing platform 110, an ATM server infrastructure 120, a user augmented reality device 130, and an ATM 140.

As illustrated in greater detail below, augmented reality experience computing platform 110 may include one or more computing devices configured to perform one or more of the functions described herein. For example, augmented reality experience computing platform 110 may include one or more computers (e.g., laptop computers, desktop computers, servers, server blades, or the like). In some embodiments, augmented reality experience computing platform 110 may also host a mobile banking portal or application provided by a financial institution.

ATM server infrastructure 120 may include a plurality of servers, and each of these servers may include one or more computing devices and/or other computer components (e.g., processors, memories, communication interfaces). In addition, and as illustrated in greater detail below, ATM server infrastructure 120 may be configured to maintain user activity information (e.g., transaction histories), user profile information (e.g., account balances), and/or perform other enterprise functions (which may, e.g., include account management functions, transaction processing functions, and/or other functions). Additionally or alternatively, ATM server infrastructure 120 may be configured to process and/or execute financial events associated with particular accounts, for instance, by updating its own databases, by writing data to other databases, and/or by commanding and/or controlling other systems and/or devices. In some instances, one or more events may be defined via a client portal provided by augmented reality experience computing platform 110 and/or one or more other systems and/or devices included in computing environment 100. Such a client portal may be hosted by an organization, and may be an online banking portal or a mobile banking portal provided by a financial institution. In addition, such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like). Additionally or alternatively, ATM server infrastructure 120 may be deployed at a specific enterprise center, such as a specific banking center operated by a financial institution.

User augmented reality device 130 may be a personal computing device (e.g., desktop computer, laptop computer) or mobile computing device (e.g., smartphone, tablet) that may be linked to and/or used by a client user (who may, e.g., be a customer of an enterprise organization, such as a financial institution). For example, user augmented reality device 130 may be a headset-style augmented reality device (e.g., AR glasses) while in other instances, user augmented reality device 130 may be another type of augmented reality device (e.g., handheld or mobile display device) or the like. In some instances, the user augmented reality device 130 may be configured to display graphical user interfaces (e.g., which may include information from ATM 140, including displaying menus allowing for the user augmented reality device 130 to control the ATM 140).

ATM 140 may be a computing device (e.g., a self-service banking machine that may include a computer server, a currency dispensing system, a deposit item receiving system, and one or more internal transport systems and/or storage systems) that may be configured to directly interact with a mobile computing device of a user (e.g., user augmented reality device 130). For example, ATM 140 may include a user interface that facilitates the interaction between the user augmented reality device 130 and a business entity (e.g., a financial institution) (not shown). ATM 140 may be configured to perform any transaction between the user augmented reality device 130 and the entity. In some examples, ATM 140 may include augmented reality capabilities for facilitating interactions between the user augmented reality device 130 and the ATM 140. In one or more arrangements, various ATMs described herein may be positioned in any location. For example, the various ATMs may be positioned at or near a financial institution or at a remote location away from the financial institution.

Computing environment 100 also may include one or more networks, which may interconnect one or more of augmented reality experience computing platform 110, ATM server infrastructure 120, user augmented reality device 130, and ATM 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, augmented reality experience computing platform 110, ATM server infrastructure 120, user augmented reality device 130, and ATM 140 may be associated with an organization, and a private sub-network included in network 150 and associated with and/or operated by the organization may include one or more networks (e.g., LANs, WANs, virtual private networks (VPNs), or the like) that interconnect augmented reality experience computing platform 110, ATM server infrastructure 120, user augmented reality device 130, and ATM 140. Network 150 also may include a public sub-network that may connect the private sub-network and/or one or more computing devices connected thereto (e.g., augmented reality experience computing platform 110, ATM server infrastructure 120, user augmented reality device 130, and ATM 140) with one or more networks and/or computing devices that are not associated with the organization.

In one or more arrangements, user augmented reality device 130, ATM 140, and/or other systems included in computing environment 100 may be any type of computing device capable of receiving a user interface, receiving input via the user interface, and communicating the received input to one or more other computing devices. For example, user augmented reality device 130, ATM 140, and/or the other systems included in computing environment 100 may, in some instances, include one or more processors, memories, communication interfaces, storage devices, and/or other components. As noted above, and as illustrated in greater detail below, any and/or all of augmented reality experience computing platform 110, ATM server infrastructure 120, user augmented reality device 130, and ATM 140 may, in some instances, be special-purpose computing devices configured to perform specific functions.

Referring to FIG. 1B, augmented reality experience computing platform 110 may include one or more processor(s) 111, memory(s) 112, and communication interface(s) 113. A data bus may interconnect processor 111, memory 112, and communication interface 113. Communication interface 113 may be a network interface configured to support communication between augmented reality experience computing platform 110 and one or more networks (e.g., network 150 or the like). Memory 112 may include one or more program modules having instructions that when executed by processor 111 cause augmented reality experience computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of augmented reality experience computing platform 110 and/or by different computing devices that may form and/or otherwise make up augmented reality experience computing platform 110. For example, memory 112 may have, store, and/or include an augmented reality experience module 112a and an augmented reality experience database 112b. Augmented reality experience module 112a may have instructions that direct and/or cause augmented reality experience computing platform 110 to provide augmented reality user interfaces for conducting ATM transactions on a mobile computing device, as discussed in greater detail below. Augmented reality experience database 112b may store information used by augmented reality experience module 112a and/or augmented reality experience computing platform 110 in providing augmented reality user interfaces for conducting ATM transactions on a mobile computing device and/or in performing other functions.

Figure 2A:
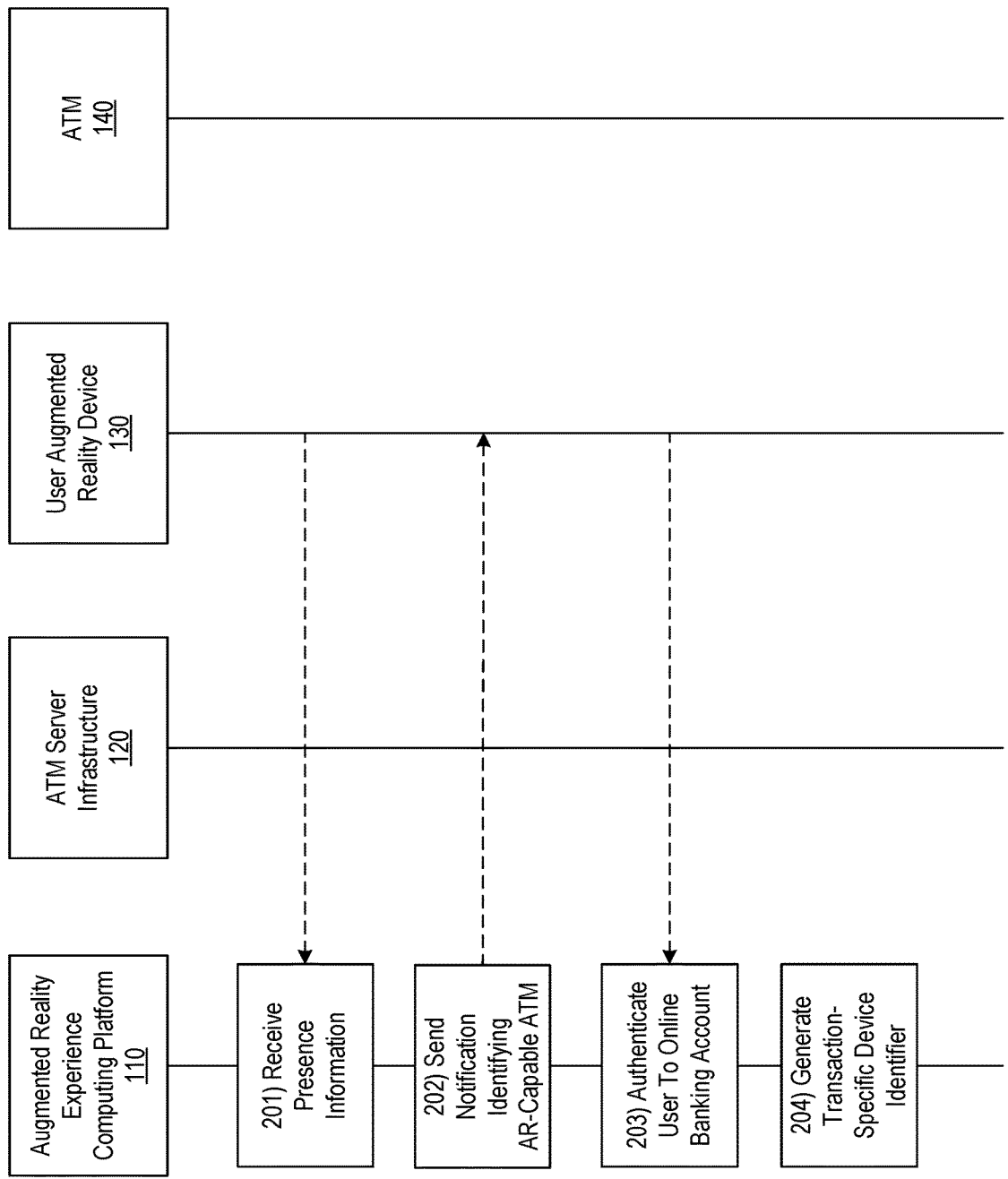

FIGS. 2A-2E depict an illustrative event sequence for deploying an enhanced processing system that provides augmented reality user interfaces on a mobile computing device for conducting ATM transactions in accordance with one or more example embodiments. Referring to FIG. 2A, at step 201, augmented reality experience computing platform 110 may receive, via a communication interface (e.g., communication interface 113), presence information associated with a mobile computing device having augmented reality capability (e.g., user augmented reality device 130). For example, at step 201, augmented reality experience computing platform 110 may receive presence information indicating that the mobile computing device (e.g., user augmented reality device 130) is within a predetermined distance of an ATM at a particular ATM location. In one or more arrangements, a user of the mobile computing device (e.g., user augmented reality device 130) may actively notify augmented reality experience computing platform 110 of the user's presence within the predetermined distance of the ATM. In one or more arrangements, augmented reality experience computing platform 110 may detect or receive the presence of the mobile computing device (e.g., user augmented reality device 130) within the predetermined distance of the ATM using a distance detection sensor or another sensor device.

At step 202, in some embodiments, augmented reality experience computing platform 110 may send, via the communication interface (e.g., communication interface 113), a notification to the mobile computing device (e.g., user augmented reality device 130) identifying the ATM at the particular location as having augmented reality capability based on detecting and/or receiving the presence information indicating that the mobile computing device (e.g., user augmented reality device 130) is within the predetermined distance of the ATM at the particular location. For example, augmented reality experience computing platform 110 may generate and/or send one or more push notifications to the mobile computing device (e.g., user augmented reality device 130), indicating to the user of mobile computing device the availability of a nearby ATM (e.g., ATM 140) with augmented reality capabilities and inviting the user to use the ATM. In some instances, augmented reality experience computing platform 110 may communicate directly with the mobile computing device to send such notifications, while in other instances, augmented reality experience computing platform 110 may communicate with one or more push notification services and/or other intermediary servers to send various notifications the mobile computing device and/or to various other computing devices. Additionally or alternatively, the notification may be transmitted to a customer (e.g., a user of the mobile computing device) by instant message, SMS message, e-mail, phone call, page, and/or the like.

At step 203, augmented reality experience computing platform 110 may authenticate a user of the mobile computing device to an online banking account. In some instances, in authenticating the user of the mobile computing device to the online banking account, augmented reality experience computing platform 110 may receive and/or validate mobile banking credentials received from the user of the mobile computing device (e.g., user augmented reality device 130). Additionally or alternatively, augmented reality experience computing platform 110 may receive an indication that the user of the mobile computing device (e.g., user augmented reality device 130) was validated and/or authenticated by another server that supports or hosts mobile banking.

At step 204, augmented reality experience computing platform 110 may generate a transaction-specific device identifier associated with the ATM at the particular location (e.g., ATM 140). Such a transaction-specific device identifier may uniquely identify the ATM at the particular location. In some examples, the transaction-specific device identifier may be a machine readable image or code such as a quick response (QR) code, a unique numerical identifier, a unique graphical identifier, or the like. In some examples, the transaction-specific device identifier may be an identifier that is in a non-visible spectrum (e.g., not visible to a human eye) such as a Bluetooth beacon signal or an infrared beacon signal that may be detected and/or captured by the user using the mobile computing device (e.g., user augmented reality device 130).

Figure 3:
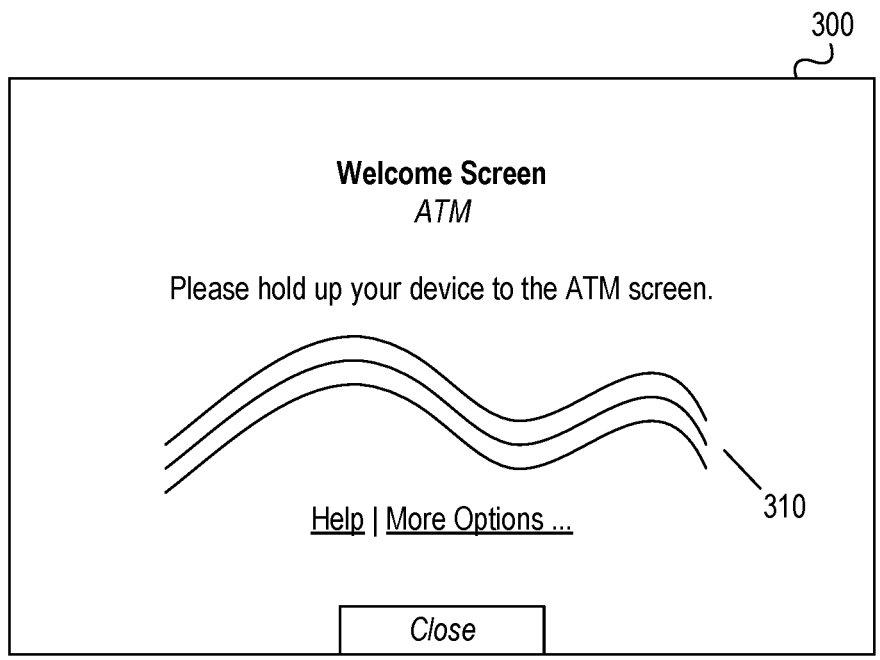
FIGS. 3-6 depict example graphical user interfaces for deploying an enhanced processing system that provides augmented reality user interfaces on a mobile computing device for conducting ATM transactions in accordance with one or more example embodiments.

Referring to FIG. 2B, in some embodiments, at step 205, augmented reality experience computing platform 110 may send, via the communication interface (e.g., communication interface 113), the transaction-specific device identifier to the ATM which in turn, at step 206, may cause the ATM (e.g., ATM 140) to display the transaction-specific device identifier. For example, augmented reality experience computing platform 110 may cause the ATM (e.g., ATM 140) to display and/or otherwise present one or more graphical user interfaces similar to graphical user interface 300, which is illustrated in FIG. 3. As seen in FIG. 3, graphical user interface 300 may include text and/or other information showing a transaction-specific device identifier 310.

Figure 4:
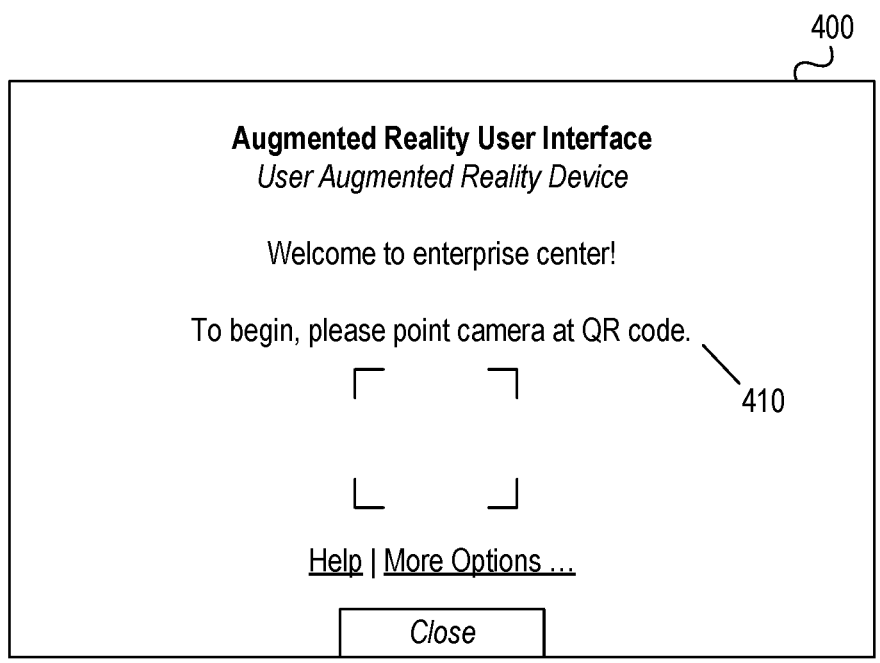

Returning to FIG. 2B, at step 207, augmented reality experience computing platform 110 may generate and send, via the communication interface (e.g., communication interface 113), an augmented reality user interface to the mobile computing device which, at step 208, may cause the mobile computing device to display the augmented reality user interface and prompt the user of the mobile computing device to use the mobile computing device to capture the transaction-specific device identifier associated with the ATM (e.g., ATM 140). For example, augmented reality experience computing platform 110 may cause the mobile computing device (e.g., user augmented reality device 130) to display and/or otherwise present one or more augmented reality user interfaces similar to graphical user interface 400, which is illustrated in FIG. 4. As seen in FIG. 4, augmented reality user interface 400 may include text and/or other information 410 prompting the user of the mobile computing device to use the mobile computing device to capture the transaction-specific device identifier associated with the ATM (e.g., "Welcome to enterprise center! To begin, please point camera at QR code." It will be appreciated that other and/or different notifications may also be provided.

As shown in FIGS. 3 and 4, in some embodiments, information displayed on a display screen of the ATM (e.g., graphical user interface 300) may be associated with, but different from, information displayed on the augmented reality user interface generated for the mobile computing device 130 (e.g., graphical user interface 400). In some embodiments, information displayed on the display screen of the ATM (e.g., graphical user interface 300) may include information displayed in non-human readable form (e.g., non-legible information 310), while information displayed on the augmented reality user interface (e.g., graphical user interface 400) generated for the mobile computing device may include information displayed in human-readable form (e.g., legible information 410 displayed in English).

By way of non-limiting example, when a user holds a mobile phone camera up to an ATM screen, the user may visualize, on the mobile phone screen, text and/or other information different from what is shown on an ATM screen. For instance, the ATM may show non-legible information (e.g., as shown in 310 of FIG. 3) while the user may see, on the mobile phone screen, the information that is intended or supposed to be seen (e.g., the non-legible information 310 deciphered as legible information 410, as shown in FIG. 4). The user may then use the mobile phone to enter requisite information without physical interaction with the ATM. Such AR aspects may enhance the customer's experience, for example, by increasing the functionality available via the ATM (e.g., by allowing more flexibility in what may be displayed in the messages between the ATM and the customer) while also ensuring the safety and security of the ATM transaction. As described above, user augmented reality device 130 may be any augmented reality device, including, but not limited to a mobile phone.

In some embodiments, information displayed on the augmented reality user interface generated for the mobile computing device may include information displayed in a preferred language associated with the mobile computing device. In some examples, information displayed on the augmented reality user interface generated for the mobile computing device may include information displayed in a preselected default language. In some examples, information displayed on the augmented reality user interface generated for the mobile computing device may include information displayed in a preferred language that is selected by the user when the user initiates a transaction request, determined based on a geographic location of the mobile computing device, or determined based on a preferred language selection made by the same user for a previous transaction request.

Figure 2C:
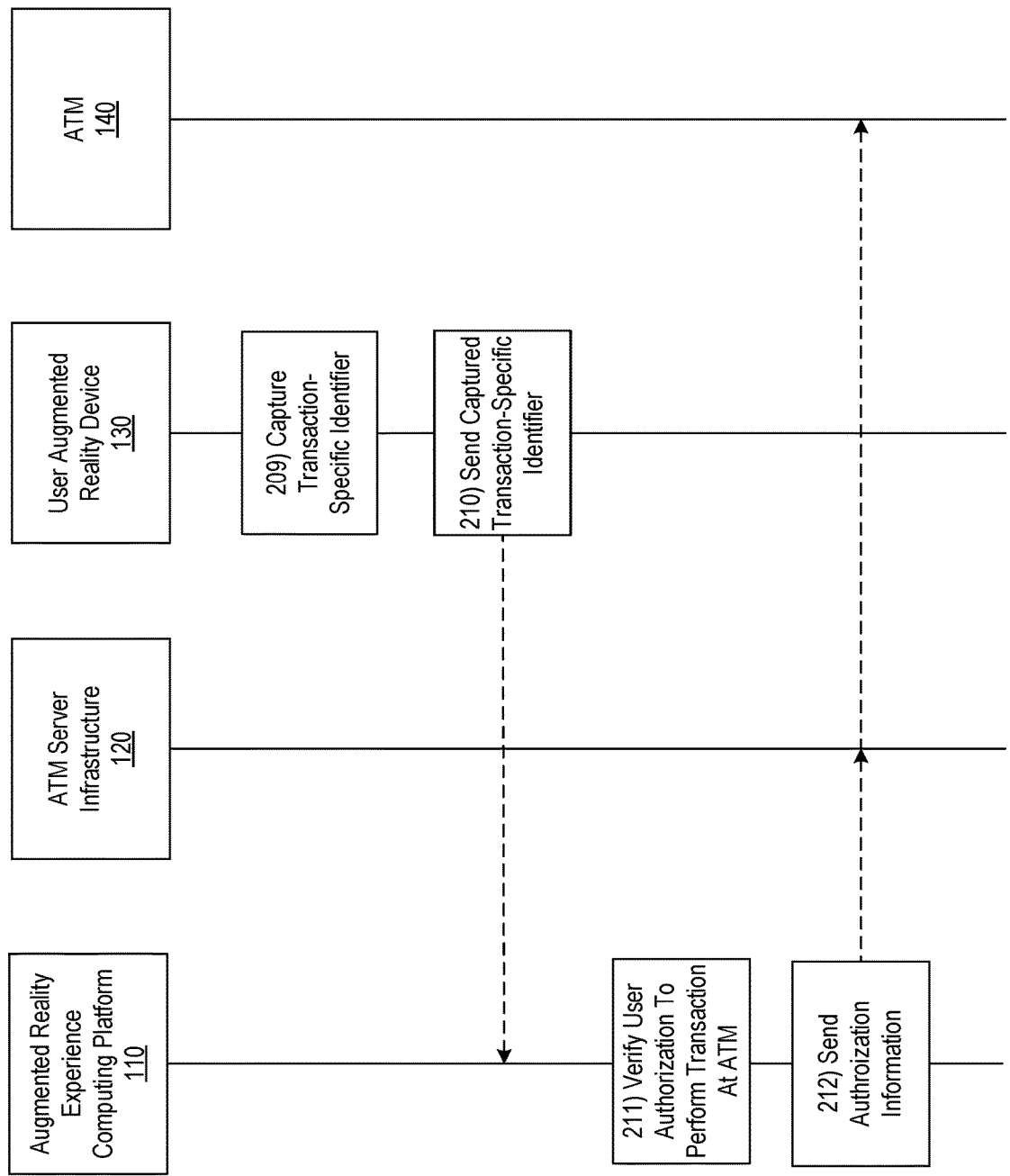

Referring to FIG. 2C, at step 209, in response to a prompt, the user of the mobile computing device (e.g., user augmented reality device 130) may use the mobile computing device (e.g., user augmented reality device 130) to capture the transaction-specific device identifier (e.g., transaction-specific device identifier 310) using, for example, a mobile phone camera, a QR code scanner, a bar code scanner, radio frequency identification (RFID) technology, or the like. Subsequently, at step 210, the mobile computing device (e.g., user augmented reality device 130) may send, among other information, the captured transaction-specific identifier to augmented reality experience computing platform 110.

At step 211, based on the captured transaction-specific device identifier, augmented reality experience computing platform 110 may verify that the user of the mobile computing device (e.g., user augmented reality device 130) is authorized to perform a transaction at a particular ATM (e.g., ATM 140). Based on the verification, augmented reality experience computing platform 110 may, at step 212, send an authorization message to the ATM server (e.g., ATM server infrastructure 120), which in turn may send the authorization to the ATM (e.g., ATM 140) at which the user is authenticated (e.g., authorized to perform a transaction). Thereafter, referring to FIG. 2D, at step 213, augmented reality experience computing platform 110 may receive, via the communication interface (e.g., communication interface 113), from the ATM server (e.g., ATM server infrastructure 120), capability information of the ATM at which the user is authenticated. The capability information may include, or example, deposit/withdrawal transactions, cash withdrawals, balance checking, and cardless transactions using a smartphone application.

At step 214, augmented reality experience computing platform 110 may cause a near field communication (NFC) connection to be established between the mobile computing device (e.g., user augmented reality device 130) and the ATM (e.g., ATM 140). Subsequently, at step 215, augmented reality experience computing platform 110 may send, via the communication interface (e.g., communication interface 113), to the mobile computing device (e.g., user augmented reality device 130), an augmented reality user interface generated for the mobile computing device based on the ATM capability information received at step 213. In addition, sending the augmented reality user interface generated for mobile computing device (e.g., user augmented reality device 130) may, at step 216, cause the mobile computing device to display the augmented reality user interface and prompt the user of the mobile computing device to use the mobile computing device to perform the transaction at the ATM.

Figure 6:
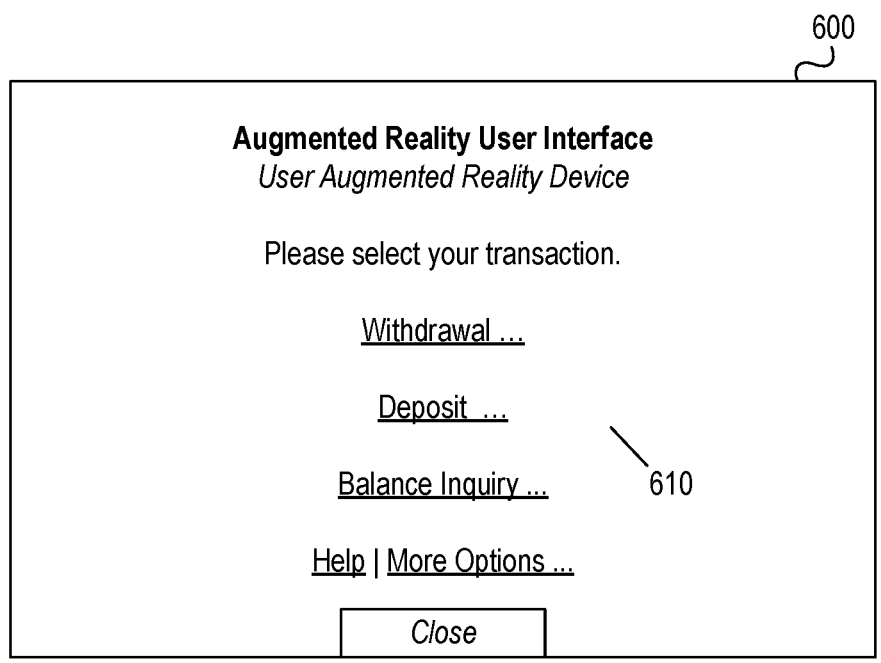

In some embodiments, at step 216, augmented reality experience computing platform 110 may cause the mobile computing device (e.g., user augmented reality device 130) to display menus (e.g., customized menus based on ATM capability information, user preferences, language preferences, and/or the like) allowing for the mobile computing device to control the ATM. For example, augmented reality experience computing platform 110 may cause the mobile computing device (e.g., user augmented reality device 130) to display and/or otherwise present one or more augmented reality user interfaces similar to graphical user interface 600, which is illustrated in FIG. 6. As seen in FIG. 6, augmented reality user interface 600 may include text and/or other information 610 prompting the user of the mobile computing device to use the mobile computing device to perform the transaction at the ATM (e.g., "Please select your transaction. [Withdrawal], [Deposit], [Balance Inquiry]"). It will be appreciated that other and/or different notifications may also be provided.

Figure 5:
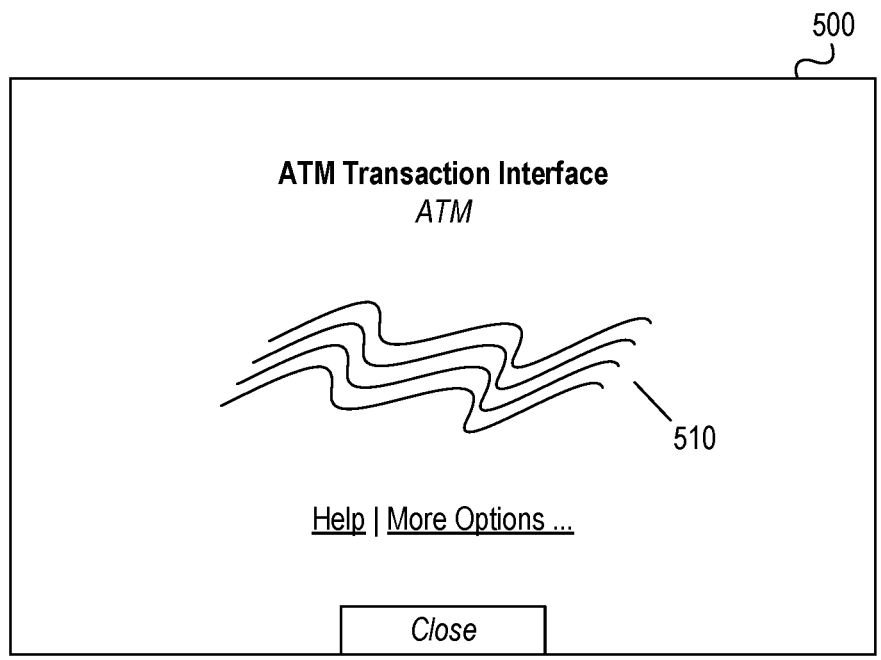

As shown in FIGS. 5 and 6, in some embodiments, information displayed on a display screen of the ATM (e.g., graphical user interface 500) may be associated with, but different from, information displayed on the augmented reality user interface generated for the mobile computing device 130 (e.g., graphical user interface 600). In some embodiments, information displayed on the display screen of the ATM (e.g., graphical user interface 500) may include information displayed in non-human readable form (e.g., non-legible information 510), while information displayed on the augmented reality user interface (e.g., graphical user interface 600) generated for the mobile computing device may include information displayed in human-readable form (e.g., legible information 610 displayed in English).

In some instances, the augmented reality interfaces may enhance information security, as customer-specific information and/or other sensitive information might only be displayed in the augmented reality interfaces presented on user augmented reality device 130 (e.g., augmented reality user interfaces 400, 600), while being presented in non-human readable form or the like in automated teller machine interfaces (e.g., ATM interfaces 300, 500).

Figure 2E:
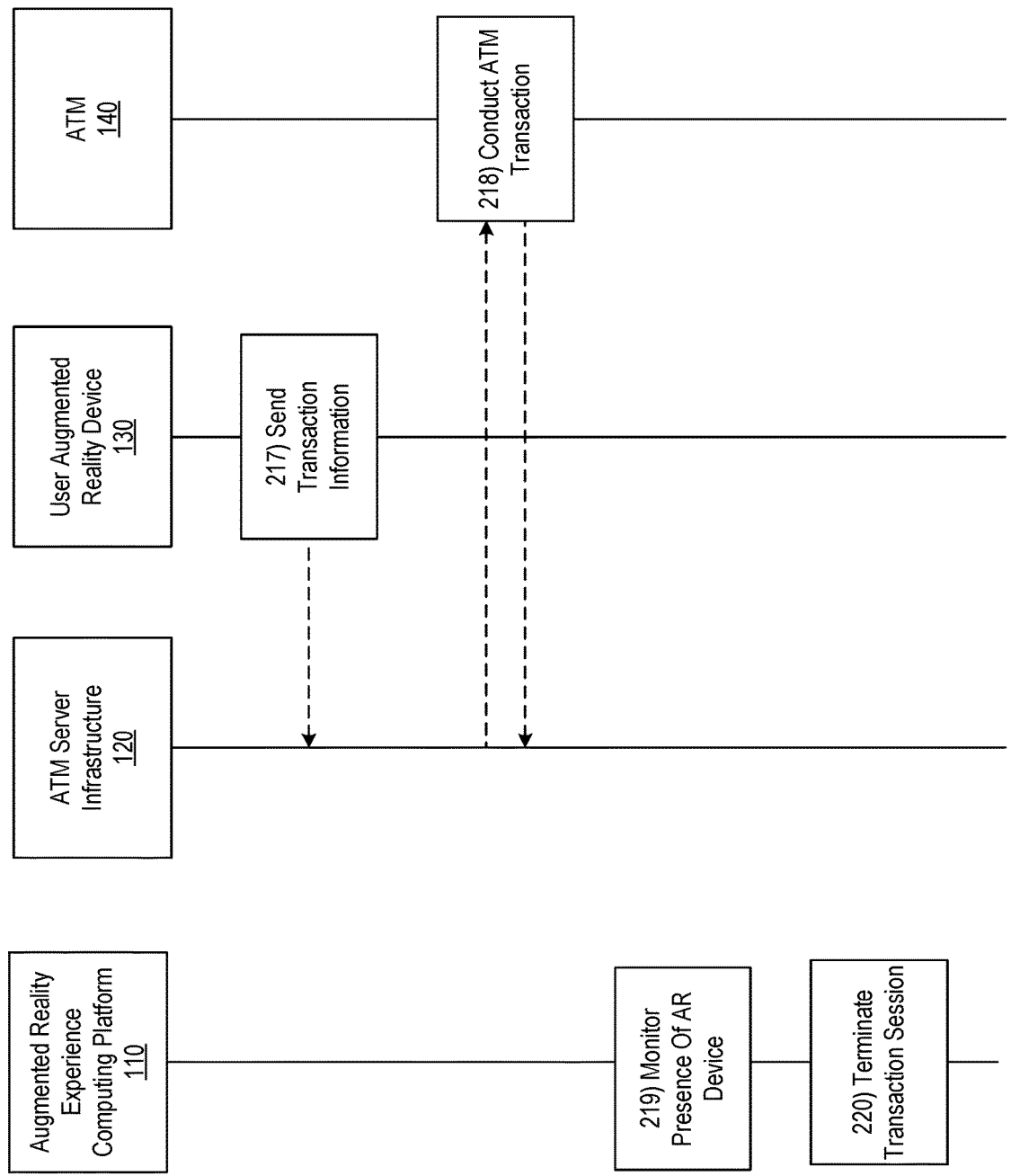

Referring to FIG. 2E, at step 217, the user of the mobile computing device (e.g., user augmented reality device 130) may provide input (e.g., to ATM server infrastructure 120) via their AR device rather than interacting with the ATM (e.g., ATM 140). For instance, the user of augmented reality device 130 may enter a transaction information by interacting with a spatial keyboard presented by augmented reality device 130 (e.g., instead of interacting with a physical keyboard of ATM 140).

At step 218, augmented reality experience computing platform 110 may cause the ATM (e.g., ATM 140) to complete the transaction based on information received from the mobile computing device (e.g., user augmented reality device 130) via the NFC connection. For example, based on information received from the mobile computing device (e.g., user augmented reality device 130) at step 217, ATM server infrastructure 120 may send commands on to ATM 140, which in turn may send feedback back to ATM server infrastructure 120 for conducting the ATM transaction. In some embodiments, the authenticated session ends once the transaction is complete.

At step 219, in some embodiments, augmented reality experience computing platform 110 may monitor the presence of the mobile computing device (e.g., user augmented reality device 130). At step 220, based on receiving the presence information indicating that the mobile computing device of the user (e.g., user augmented reality device 130) is outside of a predetermined range or distance of the ATM (e.g., ATM 140), the computing platform may terminate the transaction at the ATM (e.g., close the authenticated status of the user). For example, based on detecting a dropped connection (e.g., the user has walked away from the ATM), augmented reality experience computing platform 110 may require the user to be re-authenticated on the mobile computing device (e.g., user augmented reality device 130). In addition, by closing the authenticated session, the user may be prevented from continuing with the ATM transaction (e.g., the user may be brought back to the main screen) until the user is re-authenticated with the ATM.

Figure 7:
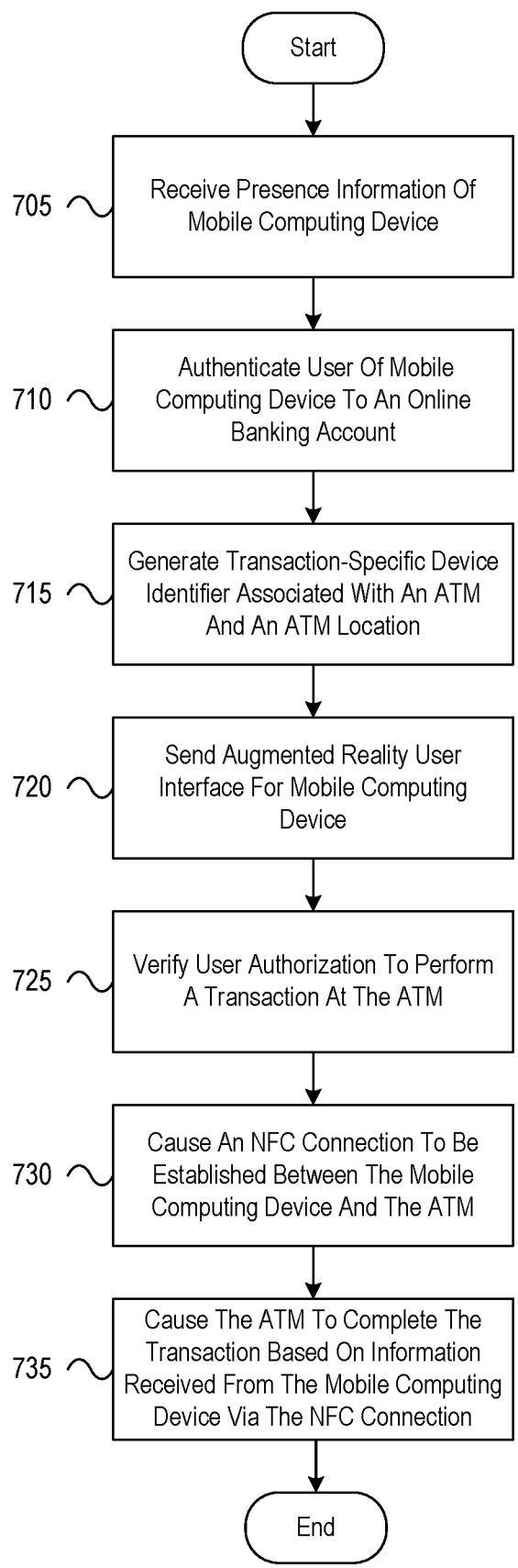
FIG. 7 depicts an illustrative method for deploying an enhanced processing system that provides augmented reality user interfaces on a mobile computing device for conducting ATM transactions in accordance with one or more example embodiments.

FIG. 7 depicts an illustrative method for deploying an enhanced processing system that provides augmented reality user interfaces on a mobile computing device for conducting ATM transactions in accordance with one or more example embodiments. Referring to FIG. 7, at step 705, a computing platform having at least one processor, a communication interface, and memory may receive, via the communication interface, presence information indicating that a mobile computing device is within a predetermined distance of a first ATM at a first location. At step 710, the computing platform may authenticate a user of the mobile computing device to an online banking account. At step 715, the computing platform may generate a transaction-specific device identifier associated with the first ATM. In addition, the transaction-specific device identifier may uniquely identify the first ATM at the first location. At step 720, the computing platform may send, via the communication interface, to the mobile computing device, a first augmented reality user interface generated for the mobile computing device. In addition, sending the first augmented reality user interface generated for the mobile computing device may cause the mobile computing device to display the first augmented reality user interface and prompt the user of the mobile computing device to use the mobile computing device to capture the transaction-specific device identifier associated with the first ATM. At step 725, the computing platform may verify that the user of the mobile computing device is authorized to perform a transaction at the first ATM at the first location based on the transaction-specific device identifier captured by the mobile computing device. At step 730, based on verifying that the user of the mobile computing device is authorized to perform the transaction at the first ATM at the first location, the computing platform may cause a near field communication connection to be established between the mobile computing device and the first ATM. At step 735, after the near field communication connection is established, the computing platform may cause the first ATM to complete the transaction based on information received from the mobile computing device via the near field communication connection.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor;
a communication interface communicatively coupled to the at least one processor; and
memory storing computer-readable instructions that, when executed by the at least one processor, cause the computing platform to:
receive, via the communication interface, presence information indicating that a mobile computing device is within a predetermined distance of a first automated teller machine (ATM) at a first location;
based on receiving the presence information indicating that the mobile computing device is within the predetermined distance of the first ATM at the first location, send, via the communication interface, to the mobile computing device, a notification identifying the first ATM at the first location as having augmented reality capability;
authenticate a user of the mobile computing device to an online banking account;

generate a transaction-specific device identifier associated with the first ATM, wherein the transaction-specific device identifier uniquely identifies the first ATM at the first location;

send, via the communication interface, the transaction-specific device identifier to the first ATM and cause the first ATM to display the transaction-specific device identifier;

send, via the communication interface, to the mobile computing device, a first augmented reality user interface generated for the mobile computing device, wherein sending the first augmented reality user interface generated for the mobile computing device causes the mobile computing device to display the first augmented reality user interface, and prompt the user of the mobile computing device to use the mobile computing device to capture the transaction-specific device identifier displayed on the first ATM;

verify that the user of the mobile computing device is authorized to perform a transaction at the first ATM at the first location based on the transaction-specific device identifier captured by the mobile computing device;

based on verifying that the user of the mobile computing device is authorized to perform the transaction at the first ATM at the first location, cause a near field communication connection to be established between the mobile computing device and the first ATM;

send, via the communication interface, to the mobile computing device, a second augmented reality user interface generated for the mobile computing device, wherein sending the second augmented reality user interface generated for the mobile computing device causes the mobile computing device to display the second augmented reality user interface, and prompt the user of the mobile computing device to use the mobile computing device to perform the transaction at the first ATM, wherein prompting the user of the mobile computing device to use the mobile computing device to perform the transaction at the first ATM comprises prompting the user of the mobile computing device to use the mobile computing device to read information displayed on a display screen of the first ATM, wherein the information displayed on the display screen of the first ATM is associated with, but different from, information displayed on the second augmented reality user interface generated for the mobile computing device; and after prompting the user of the mobile computing device to use the mobile computing device to perform the transaction at the first ATM, cause the first ATM to complete the transaction based on information received from the mobile computing device via the near field communication connection.

2. The computing platform of claim 1, wherein generating the transaction-specific device identifier associated with the first ATM comprises generating one or more of: a quick response (QR) code, a unique numerical identifier, or a unique graphical identifier.

3. The computing platform of claim 1, wherein the information displayed on the display screen of the first ATM is associated with, but different from, information displayed on the first augmented reality user interface generated for the mobile computing device.

4. The computing platform of claim 1, wherein the information displayed on the display screen of the first ATM comprises information displayed in non-human readable form.

5. The computing platform of claim 1, wherein information displayed on the first augmented reality user interface generated for the mobile computing device comprises information displayed in human-readable form.

6. The computing platform of claim 1, wherein information displayed on the first augmented reality user interface generated for the mobile computing device comprises information displayed in a preferred language associated with the mobile computing device.

7. The computing platform of claim 1, wherein the memory stores additional computer-readable instructions that, when executed by the at least one processor, cause the computing platform to:

receive, via the communication interface, presence information indicating that the mobile computing device is outside of the predetermined distance of the first ATM at the first location; and based on receiving the presence information indicating that the mobile computing device of the user is outside of the predetermined distance of the first ATM at the first location, terminate the transaction at the first ATM.

8. The computing platform of claim 1, wherein the memory stores additional computer-readable instructions that, when executed by the at least one processor, cause the computing platform to:

receive, via the communication interface, capability information of the first ATM at the first location.

9. The computing platform of claim 1, wherein the information displayed on the display screen of the first ATM comprises information displayed in non-human readable form.

10. The computing platform of claim 1, wherein the information displayed on the second augmented reality user interface generated for the mobile computing device comprises information displayed in human-readable form.

11. The computing platform of claim 1, wherein the information displayed on the second augmented reality user interface generated for the mobile computing device comprises information displayed in a preferred language associated with the mobile computing device.

12. A method, comprising:

receiving, by at least one processor, via a communication interface, presence information indicating that a mobile computing device is within a predetermined distance of a first automated teller machine (ATM) at a first location;

based on receiving the presence information indicating that the mobile computing device is within the predetermined distance of the first ATM at the first location, sending, via the communication interface, to the mobile computing device, a notification identifying the first ATM at the first location as having augmented reality capability;

authenticating, by the at least one processor, a user of the mobile computing device to an online banking account;

generating, by the at least one processor, a transaction-specific device identifier associated with the first ATM, wherein the transaction-specific device identifier uniquely identifies the first ATM at the first location;

sending, via the communication interface, the transaction-specific device identifier to the first ATM and cause the first ATM to display the transaction-specific device identifier;

sending, by the at least one processor, via the communication interface, to the mobile computing device, a first augmented reality user interface generated for the mobile computing device, wherein sending the first augmented reality user interface generated for the mobile computing device causes the mobile computing device to display the first augmented reality user interface and prompt the user of the mobile computing device to use the mobile computing device to capture the transaction-specific device identifier displayed on the first ATM;

verifying, by the at least one processor, that the user of the mobile computing device is authorized to perform a transaction at the first ATM at the first location based on the transaction-specific device identifier captured by the mobile computing device;

sending, by the at least one processor, via the communication interface, to the mobile computing device, a second augmented reality user interface generated for the mobile computing device, wherein sending the second augmented reality user interface generated for the mobile computing device causes the mobile computing device to display the second augmented reality user interface, and prompt the user of the mobile computing device to use the mobile computing device to perform the transaction at the first ATM, wherein prompting the user of the mobile computing device to use the mobile computing device to perform the transaction at the first ATM comprises prompting the user of the mobile computing device to use the mobile computing device to read information displayed on a display screen of the first ATM, wherein the information displayed on the display screen of the first ATM is associated with, but different from, information displayed on the second augmented reality user interface generated for the mobile computing device;

based on verifying that the user of the mobile computing device is authorized to perform the transaction at the first ATM at the first location, causing, by the at least one processor, a near field communication connection to be established between the mobile computing device and the first ATM; and after prompting the user of the mobile computing device to use the mobile computing device to perform the transaction at the first ATM, causing, by the at least one processor, the first ATM to complete the transaction based on information received from the mobile computing device via the near field communication connection.

13. The method of claim 12, wherein the information displayed on the display screen of the first ATM is associated with, but different from, information displayed on the first augmented reality user interface of the mobile computing device.

14. The method of claim 12, wherein the information displayed on the display screen of the first ATM comprises information displayed in non-human readable form and information displayed on the first augmented reality user interface of the mobile computing device comprises information displayed in human-readable form.

15. The method of claim 12, further comprising:
receiving, by the at least one processor, via the communication interface, capability information of the first ATM at the first location.

16. One or more non-transitory computer-readable media storing instructions that, when executed by a computing platform comprising at least one processor, a communication interface, and memory, cause the computing platform to:

receive, via the communication interface, presence information indicating that a mobile computing device is within a predetermined distance of a first automated teller machine (ATM) at a first location;

based on receiving the presence information indicating that the mobile computing device is within the predetermined distance of the first ATM at the first location, send, via the communication interface, to the mobile computing device, a notification identifying the first ATM at the first location as having augmented reality capability;

authenticate a user of the mobile computing device to an online banking account;

generate a transaction-specific device identifier associated with the first ATM, wherein the transaction-specific device identifier uniquely identifies the first ATM at the first location;

send, via the communication interface, the transaction-specific device identifier to the first ATM and cause the first ATM to display the transaction-specific device identifier;

send, via the communication interface, to the mobile computing device, a first augmented reality user interface generated for the mobile computing device, wherein sending the first augmented reality user interface generated for the mobile computing device causes the mobile computing device to display the first augmented reality user interface and prompt the user of the mobile computing device to use the mobile computing device to capture the transaction-specific device identifier displayed on the first ATM;

verify that the user of the mobile computing device is authorized to perform a transaction at the first ATM at the first location based on the transaction-specific device identifier captured by the mobile computing device;

based on verifying that the user of the mobile computing device is authorized to perform the transaction at the first ATM at the first location, cause a near field communication connection to be established between the mobile computing device and the first ATM;

send, via the communication interface, to the mobile computing device, a second augmented reality user interface generated for the mobile computing device, wherein sending the second augmented reality user interface generated for the mobile computing device causes the mobile computing device to display the second augmented reality user interface, and prompt the user of the mobile computing device to use the mobile computing device to perform the transaction at the first ATM, wherein prompting the user of the mobile computing device to use the mobile computing device to perform the transaction at the first ATM comprises prompting the user of the mobile computing device to use the mobile computing device to read information displayed on a display screen of the first ATM, wherein the information displayed on the display screen of the first ATM is associated with, but different from, information displayed on the second augmented reality user interface generated for the mobile computing device; and after prompting the user of the mobile computing device to use the mobile computing device to perform the transaction at the first ATM, cause the first ATM to complete the transaction based on information received from the mobile computing device via the near field communication connection.

\* \* \* \* \*